July 8, 1941.   R. BERNT   2,248,801
METHOD OF MAKING REFRIGERATING APPARATUS
Filed May 25, 1938   2 Sheets-Sheet 1
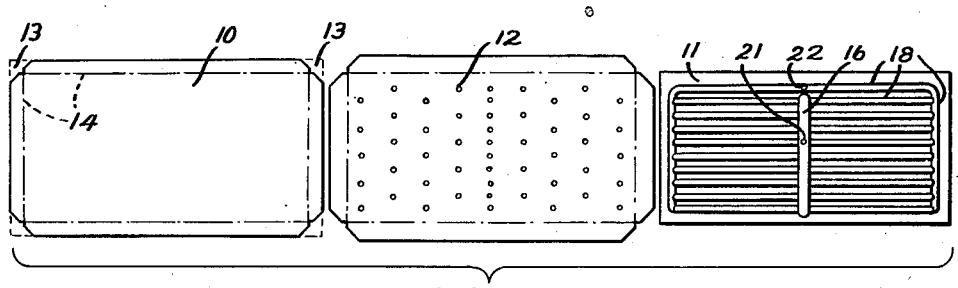
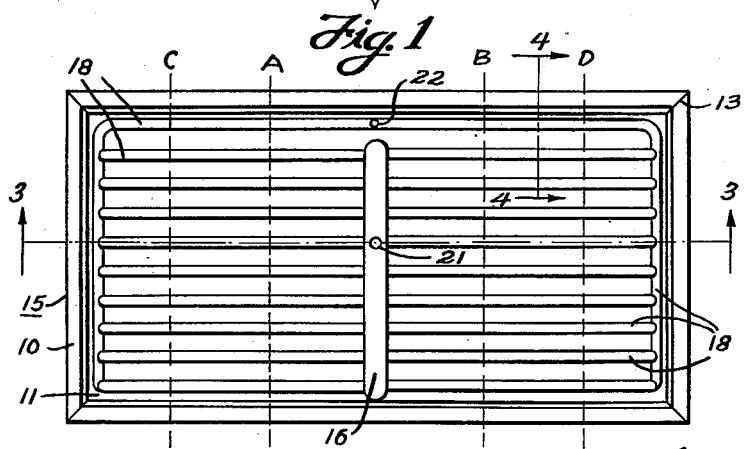
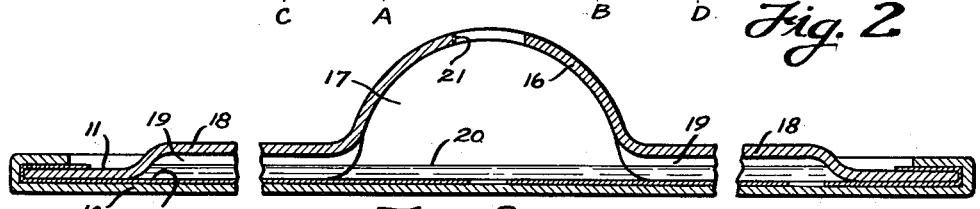
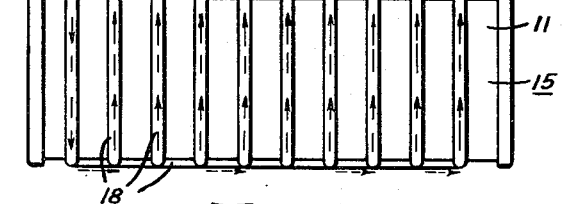
INVENTOR.
RUSSELL BERNT.
BY
Spencer, Hardman and Fake.
HIS ATTORNEYS.

July 8, 1941.  R. BERNT  2,248,801

METHOD OF MAKING REFRIGERATING APPARATUS

Filed May 25, 1938  2 Sheets-Sheet 2

INVENTOR.
RUSSELL BERNT.
BY
*Spencer, Hardman and Zehr.*
HIS ATTORNEYS.

Patented July 8, 1941

2,248,801

UNITED STATES PATENT OFFICE 2,248,801

METHOD OF MAKING REFRIGERATING APPARATUS

Russell Bernt, Dayton, Ohio, assignor to General Motors Corporation, Dayton, Ohio, a corporation of Delaware Application May 25, 1938, Serial No. 210,016

3 Claims. (Cl. 113—112)

This invention relates to a method of brazing and while it is directed to the brazing of metal parts in general it is particularly applicable to the brazing together of brass sheets in the manufacture of heat exchangers such as evaporators for refrigerating systems.

I am aware of the fact that substantially flat, embossed, brass sheets have previously been superimposed and bonded together to provide interconnecting but peripherally closed fluid passageways and chambers therebetween and thereafter bent to provide an evaporator for a refrigerating system. Such evaporators have been made in accordance with the disclosures in the S. M. Schweller Patent No. 2,067,208, issued January 12, 1937, and the F. T. Cope Patent No. 2,023,354, issued December 3, 1935. In the prior methods of making brass sheet metal evaporators such as are disclosed in the patents referred to a spelter material or sheet consisting of copper and zinc and having phosphorous or some other element imparting self-fluxing properties or a spelter sheet coated or painted with a fluxing material has been employed to cause alloying of the spelter with the brass sheets. Evaporators made in this manner or according to the patented disclosures have not been entirely or consistently satisfactory because of the lack of steps taken to overcome certain defects inherent to or associated with the process as a whole. Due to the difficulty of cleaning foreign matter, particularly flux residues of the solid or semi-solid type, from the fluid passageways between the prior bonded structures these passageways have not been thoroughly cleaned. In these prior brazing methods the spelter material or sheet located between the superimposed brass sheets would, upon heating the superimposed structure in a furnace, become depleted in zinc content by oxidation of the zinc or evaporation and escape thereof from the spelter and from the structure long prior to bringing the structure to the temperature required to cause the spelter to melt and flow thus impairing the bonding operation. These defects in prior brazing methods have resulted in improper bonding of the brass sheets together thus causing a great number of evaporators to be rejected or declared unsuitable for use for the reason that they would leak or would not withstand suitable pressure tests due to the bond between the brass sheets thereof not being uniform and continuous. My invention is therefore directed to a new method of making sheet metal evaporators and particularly to a novel and improved step in the method of brazing the brass sheets thereof together to provide a better and continuous bond therebetween.

An object of my invention is to provide an improved method of making sheet metal heat exchangers or evaporators for refrigerating systems.

Another object of my invention is to employ an improved flux-forming or fluxing material in a method of brazing substantially contiguous portions of preformed and superimposed sheet members together to form closed fluid passageways therebetween, which material evaporates during heating of the members and whose decomposition products leave no solid residue in the passageways therebetween after termination of the heating process, to thereby insure proper bonding of the superimposed members and to eliminate the necessity of flushing or washing out the passageways with liquid solvents.

A further object of my invention is to provide a brazing method wherein an improved fluxing material not only cleans or neutralizes the impurities and foreign matter from portions of superimposed sheet members to be secured together but also retards the net or total loss of zinc from a bonding agent or spelter solder therebetween during heating of the sheet metal members.

In carrying out the foregoing objects it is a still further and more specific object of my invention to provide an improved step in the method of making a fluid-tight heat exchanger by superimposing brass sheet members having a bonding material therebetween and uniformly applying heat simultaneously over the exposed surfaces of the members to melt the spelter material and bond the brass sheet members together which method step consists in, subjecting the spelter material and portions of the brass sheet members to be bonded thereby to the action of methyl alcohol during the heating process to utilize the decomposition effect and the products of thermal decomposition thereof for fluxing the union of the spelter material with the sheet metal members.

Further objects and advantages of the present invention will be apparent from the following description, reference being had to the accompanying drawings, wherein a preferred form of the present invention is clearly shown.

In the drawings:

Fig. 1 discloses a flat metal sheet, a corrugated metal sheet and a flat perforated sheet of spelter material adapted to be superimposed upon one another and secured together to form a double walled substantially flat plate-like assembly;

Fig. 2 is a top plan view of the flat plate-like assembly produced by superimposing the sheets shown in Fig. 1;

Fig. 3 is an enlarged sectional view taken on the lines 3—3 of Fig. 2 showing the elements of the plate-like assembly before bonding together and disclosing a body of liquid within the passages formed between the sheets of the assembly;

Fig. 4 is an enlarged fragmentary sectional view taken on the lines 4—4 of Fig. 2 and showing the elements of the double walled plate-like structure after being bonded together;

Fig. 7 is a front elevational view of a fluid-tight heat exchanger or evaporator for a refrigerating system provided by bending the bonded double walled plate-like structure; and Fig. 8 is a side elevational view of the heat exchanger or evaporator disclosed in Fig. 7.

Figure 5:
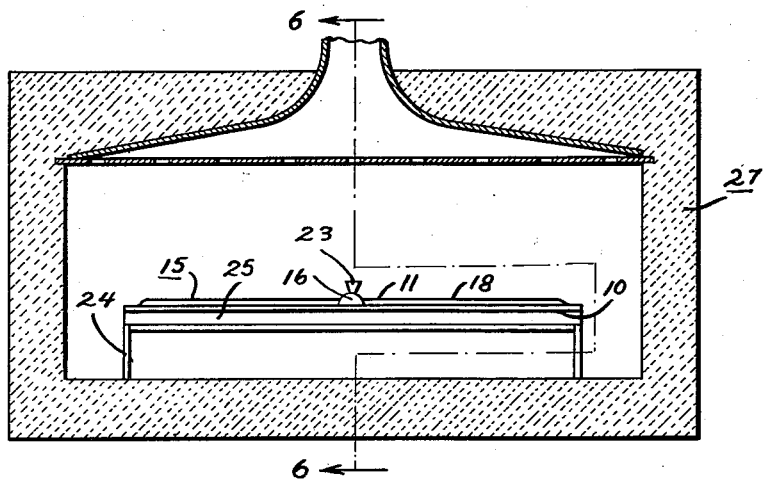
Fig. 5 is a vertical sectional view through a furnace in which the flat plate-like assembly shown in Fig. 2 is placed for applying heat thereto.

For the purpose of illustrating my invention, I will describe the manufacture of a fluid-tight heat exchanger such, for example, as an evaporator for a refrigerating system while the invention may have various other applications within the scope of the appended claims. Referring to Fig. 1 of the drawings for illustration I have shown a flat brass sheet or plate 10. Also shown in Fig. 1 is a corrugated or embossed substantially flat brass sheet or plate 11. In order to bond certain portions of sheets or plates 10 and 11 together as will hereinafter be more fully described I show in Fig. 1 a thin flat perforated sheet 12 of solder or spelter material. The solder or spelter sheet 12 is slightly larger than sheet 10 and is placed or superimposed upon the flat brass plate or sheet 10 and the corrugated brass sheet or plate 11 is then placed or superimposed upon the spelter sheet 12. It will be noted that plate or sheet 10 has its corners cut away and slit as at 13 to facilitate bending of the sheet. The spelter sheet 12 may, if desired, also be cut or slit in a manner similar to sheet 10. The portions of brass sheet or plate 10 disposed between its edges and the dot-dash fold lines designated at 14 and the edge portions of sheet 12 are then bent around the edges and folded over the peripheries of the brass sheet or plate 11 to secure the sheets or plates 10, 11 and 12 together to provide the flat plate-like double walled assembly or structure 15 as shown in Fig. 2. The metal sheets 10 and 11 may consist of any desired copper and zinc content and are preferably of approximately 85% copper and 15% zinc. The spelter or solder sheet 12 may be of a silver solder composition but is preferably also of brass and consists of a higher zinc content than the sheets 10 and 11, for example, 60% copper and 40% zinc in order to provide a spelter sheet which will melt at a temperature below that at which brass sheets 10 and 11 will melt. It is to be understood that the brass sheets and the spelter or solder sheet may consist of various percentages of metallic substances relative to one another so long as the spelter sheet can be melted at a lower temperature than the temperature at which the brass sheets will melt. The melting point of the brass sheets or plates 10 and 11 described in the present illustration is somewhere in the neighborhood of 1800° F. while the melting point of the solder or spelter sheet 12 is at approximately 1650° F. Thus it is apparent that a temperature from approximately 1700° to 1750° F. will cause melting of the spelter sheet 12 without melting the brass sheets 10 and 11.

An embossed portion 16 provided in the corrugated brass sheet or plate 11 forms a header or manifold passage 17 (see Fig. 3) between the sheets or plates 10 and 11. Corrugated portions 18 form passageways 19 (see Figs. 3 and 4) between the plates 10 and 11. The embossed portion 16 is provided, before the sheets are bonded together, with an opening 21. Another opening 22 is provided in the corrugation 18, which extends entirely across the structure 15 adjacent one end of header 16, before the sheets 10 and 11 are bonded together. These openings 21 and 22 are for a purpose to be hereinafter more fully described. It will be apparent by referring to Fig. 3 that the conduits or passageways 19 communicate with the manifold or chamber 17. The bending of the peripheral portion of sheets or plates 10 and 12 around and over the edge portions of sheet or plate 11, as previously described, clamps or presses certain portions of sheets 10, 11 and 12 into engagement with one another. The substantially flat double walled assembly 15 is ready to be heated to cause melting of the spelter sheet 12 and bonding or brazing of the sheets or plates 10 and 11 together. However, in accordance with my invention and to provide the improved step in the brazing method I place in the hollow flat double walled structure or assembly 15 a predetermined amount of organic liquid, such as methyl alcohol, as indicated by the numeral 20 shown in Fig. 3 for a purpose to be hereinafter more fully explained. It is to be noted that some of the perforations provided in spelter sheet 12 register with the chamber 17 and others with the passageways 19 (see Fig. 3) to permit alcohol to creep along the spelter sheet 12 in contact with the brass sheets 10 and 11. The level of liquid in structure 15 is such that, aided by surface tension phenomenon and the slight hydrostatic head, it will effect wetting of the entire surfaces of the sheets and spelter material in contact or near contact and will fill, to the exclusion of atmospheric oxygen, spaces which may be present between such areas.

Figure 6:
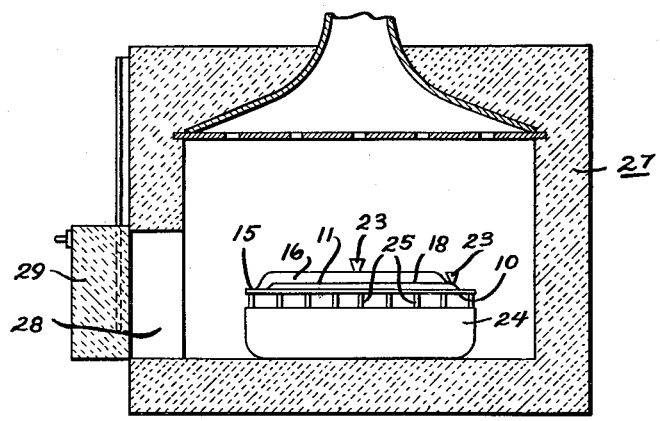
Fig. 6 is a sectional view of the furnace shown in Fig. 5 and is taken on the lines 6—6 thereof.

The metal sheets 10, 11 and 12 are pressed together in such manner that the interior of structure 15 is substantially leak proof in the absence of pressure therein. Thus the methyl alcohol placed in the structure 15 and permitted to flow in the passageways throughout the flat structure is substantially sealed therein. The openings 21 and 22 provided in sheet 11 serve as filler openings to permit the alcohol to be inserted in the structure 15 and these openings are preferably partially closed or plugged prior to heating the structure. Since it is desired to maintain the methyl alcohol, its vapor and products of thermal decomposition thereof, in association with the portions of the brass sheets 10 and 11 to be bonded together and in association with the material of spelter sheet 12 during heating of the structure 15 the plugs placed in openings 21 and 22 may be in the form of vented plugs or check valve plugs generally indicated at 23 in Figs. 5 and 6. Such plugs 23 will permit some of the vapors and decomposition products of the alcohol to escape from the closed hollow structure 15 during heating thereof to thereby prevent the building up of pressure therein. The hollow substantially flat double walled plate-like assembly or structure 15 with the methyl alcohol 20 therein is then placed upon a cart or sled 24, comprising a plurality of crossbeams 25 for supporting the structure 15 at spaced apart points throughout its area, (see Figs. 5 and 6) and this cart or sled 24 together with the structure 15 supported thereon is then moved into a furnace, preferably containing a reducing atmosphere and generally designated by the reference character 27, through the access door opening 28 which is closed by the door 29. The sheets or plates 10, 11 and 12 of the structure 15 are preferably forced toward one another during heating thereof in the furnace. Any suitable arrangement may be employed for this purpose and for example a plurality of weights may be placed or lowered upon structure 15. The plates 10 and 11 will be suitably pressed or forced toward one another to cause the spelter material 12 to bond certain substantially contiguous portions of the plates together uniformly over lines adjacent the passageways 17 and 19. After the double walled structure 15 has been moved into the furnace 27 and after the plates are suitably pressed toward one another, the door 29 of furnace 27 is closed. Since the temperature of the interior of furnace 27 is maintained at substantially from 1700° to 1750° or 1780° F. the structure is permitted to remain therein for a predetermined period of time sufficient to cause melting of the spelter or solder sheet 12 by radiant heat.

The furnace may be heated in any suitable manner such for example, as by electric resistance units or heaters located wherever desired throughout the interior of the furnace. The furnace may, if desired, comprise a heated brazing zone and a cooling zone both containing a reducing atmosphere so that after the structure 15 has been heated and brazed it can be moved over into the cooling zone and cooled to room temperature in the reducing atmosphere. On the other hand the heated and brazed together structure 15 may be removed from the furnace and cooled to room temperature in a separate cooling chamber containing a reducing atmosphere.

The heat absorbed by the structure 15 first vaporizes the methyl alcohol with a consequential relatively large increase in volume thus causing a current of vapor to flow rapidly away from every portion of the surface area of the spelter material 12 and sheet members 10 and 11 which had been wetted by the alcohol. Vapor also flows from the surface of the alcohol to the exterior of structure 15 through the partially closed openings 21 and 22 and from the passageways around the edges of the structure which may not be entirely sealed against the passage of vapors. The volumetric increase of the alcohol and flow of a portion thereof outwardly of the structure 15 ejects atmospheric oxygen which may have been contained in the passageways and entrapped between portions of the sheet members 10 and 11 in near contact with one another. Thus any gases such as oxygen, carbon dioxide, water vapor, etc., occluded or absorbed by the members and liberated at a temperature corresponding to the boiling point of methyl alcohol are ejected and excluded from the interior of the structure 15 to be brazed. Continued heating of the structure 15 completely vaporizes the methyl alcohol and causes same to break down into its constituent parts. The break-down effect of the methyl alcohol or at least one of its decomposition products forms a fluxing agent which attacks the surfaces of the brass sheets to remove and clean same of grease, impurities and other foreign matter to thereby facilitate the alloying of the spelter material with the brass sheets. Thermal decomposition of methyl alcohol results in the formation of such vaporous products as carbon monoxide and hydrogen. Formaldehyde is also generally considered to be one of the possible intermediate products of thermal decomposition of the menthenol vapor produced by vaporizing the methyl alcohol. The use of methyl alcohol as an atmosphere source within the structure to be bonded, its thermal decomposition, its decomposition products and intermediate products are maintained in association with or in the presence of the portions of the structure to be bonded throughout the duration of heating the structure to thereby produce a reducing action on oxides and particularly zinc oxide well below the melting range of the spelter material. The removal of atmospheric oxygen from the structure 15 and the reducing atmosphere formed therein by vaporization of the methyl alcohol retards the vaporization of zinc from the spelter sheet and reduces the total net loss of zinc to thereby maintain the composition of the spelter sheet 12 substantially unchanged until it melts and flows or alloys with the brass sheets. The prevention of formation of zinc oxide in the structure 15 is of high importance to the successful bonding of the brass sheets together. It is to be understood that should too much methyl alcohol be placed in the structure 15 or should the alcohol placed therein generate or create an abnormal pressure in the hollow structure 15 during heating thereof the vented plugs or check valves 23 will permit escape of some of the vapors to relieve this pressure and prevent deformation or separation of the plates or sheets.

The details of construction of the furnace 27 have no bearing on the present invention for the reason that many different types of furnaces may be employed to carry out the manufacture of the improved heat exchanger or evaporator by the method herein disclosed so long as the temperature of the entire exchanger or evaporator to be brazed is simultaneously and uniformly applied, which is an essential feature to the uniform and continuous bonding of portions of the structure throughout its entire area. To reduce the heating period of structure 15 to a minimum and to cause uniform heating thereof it may, prior to being placed in the furnace 27, be coated or covered with a non-reflecting substance in accordance with the disclosure contained in the L. F. Grenell Patent 2,085,746 issued July 6, 1937.

Referring to Fig. 4 of the drawings wherein I have shown an enlarged cross-section of the double walled structure 15 after the structure has been heated and brazed it will be noted that the spelter sheet or material 12 has been deformed by the melting thereof and that the spelter has flown toward and alloyed with those portions of the plates 10 and 11 which are substantially contiguous with one another. It will also be noted that the spelter material has caused the substantially contiguous portions of the brass sheets 10 and 11 to be firmly and continuously brazed or bonded together. The bonded together substantially flat plate-like double walled structure 15, after having been cooled, is bent first along the lines designated at A—A and B—B in Fig. 2 to form side walls of a sharp freezing compartment for the evaporator and is again bent along the lines designated at C—C and D—D in Fig. 2 to form a bottom wall of a freezing compartment (see Fig. 7). The ends of the structure 15 brought together at the bottom of the freezing compartment are preferably secured to one another in any suitable manner. The brass sheet evaporator thus formed may be plated in any suitable and well known manner with a metallic coating such as tin or chromium to afford a smooth finish thereon which will be neat in appearance and which can be readily and easily cleaned without damage to the finish. The opening 22 leading to passageways 19, formed between the brass plates or sheets 10 and 11 by the corrugations 18, is adapted to receive one end of a liquid refrigerant supply pipe or conduit 35 having its other end connected to any conventional or well known refrigerant liquefying and circulating unit (not shown). The gaseous refrigerant return pipe or conduit 36 of the refrigerating system may be secured or attached to the opening 21 provided in header 16 of the evaporator 15. Refrigerant admitted to the passageways or conduits formed between the double walled evaporator 15 first flows from pipe 35 through the opening 22 and thence to the passageways 19 to the bottom wall of the evaporator. Refrigerant flows from the bottom wall of the evaporator 15 upwardly in multiple through the plurality of passageways 19 to the passage or chamber 17, as indicated by the arrows in Fig. 8, from where it flows through the opening 21 and pipe 36 back to the refrigerant liquefying and circulating unit.

From the foregoing it will be seen that I have provided an improved method and particularly a new and novel step in the method of making fluid-tight heat exchangers or evaporators for refrigerating systems. My improved step in the method disclosed insures a tight and uniform or continuous bond between the passageways formed between the brazed together metal sheets and thereby greatly reduces manufacturing costs in that it reduces to a minimum the number of heat exchangers or evaporators which are rejected because of leaky passageways or because of their failure to withstand predetermined pressure tests. My invention permits the use of a flux forming or fluxing material for the spelter or bonding agent while at the same time eliminating the difficult task of washing or flushing out the closed passageways of a sheet metal heat exchanger since the flux leaves no solid or semi-solid deposits in the passageways and since the flux vaporizes and readily flows from the passageways. My invention eliminates the necessity of employing a spelter material consisting partly of phosphorous or other self-fluxing constituents and utilizes a material which is of such physical dimensions and characteristics as may be commercially feasible and more economically produced while at the same time affording proper alloying of the spelter material with the brass sheets to provide tight and continuous bonding thereof. For example, I may employ a sheet of spelter material of about 60% copper and 40% zinc which is approximately two thousandths of an inch in thickness as compared to other sheet materials containing phosphorous or the like and which are, due to manufacturing difficulties and other limitations of the phosphorous itself, essentially much thicker and consequently more expensive.

While the form of embodiment of the invention as herein disclosed, constitutes a preferred form, it is to be understood that other forms might be adopted, all coming within the scope of the claims which follow.

What is claimed is as follows:

1. In the method of making a fluid tight heat exchanger by superimposing a corrugated brass sheet member upon another brass sheet member with a spelter material therebetween and uniformly applying heat simultaneously over the entire exposed surfaces of the superimposed brass sheet members to melt the spelter material and bond the brass sheet members together around their peripheries and between the corrugations to form a plurality of closed passageways between the brass sheet members that step which consists in, placing an alcohol in the passageways between the brass sheet members and vaporizing the alcohol in the presence of the spelter material and portions of the brass sheet members to be bonded thereby during heating of the exchanger to utilize at least one of the thermal decomposition products of the alcohol for fluxing the union of the spelter material with the brass sheet members.

2. In the method of making a fluid tight heat exchanger by superimposing a corrugated brass sheet member upon another brass sheet member with a spelter material therebetween and uniformly applying heat simultaneously over the entire exposed surfaces of the superimposed brass sheet members to melt the spelter material and bond the brass sheet members together around their peripheries and between the corrugations to form a plurality of closed passageways between the brass sheet members that step which consists in, placing methyl alcohol in the passageways between the brass sheet members and vaporizing the alcohol in the presence of the spelter material and portions of the brass sheet members to be bonded thereby during heating of the exchanger to utilize at least one of the thermal decomposition products of the alcohol for fluxing the union of the spelter material with the brass sheet members.

3. In the method of making a fluid tight heat exchanger by superimposing a corrugated sheet metal member upon another sheet metal member with a spelter material therebetween, the spelter material having a melting point lower than the melting point of the corrugated sheet metal members, and uniformly applying heat simultaneously over the entire exposed surfaces of the superimposed sheet metal members to melt the spelter material and bond the sheet metal members together around their peripheries and between the corrugations to form a plurality of closed passageways between the sheet metal members that step which consists in, placing an alcohol in the passageways between the sheet metal members and vaporizing the alcohol in the presence of the spelter material and portions of the sheet metal members to be bonded thereby during heating of the exchanger to utilize at least one of the thermal decomposition products of the alcohol for fluxing the union of the spelter material with the sheet metal members.

RUSSELL BERNT.